United States Patent [19]

Bianchi

[11] Patent Number: 5,291,974
[45] Date of Patent: Mar. 8, 1994

[54] HIGH PRESSURE SELF-CONTAINED GAS SPRING OR DIE CYLINDER AND SEALING ARRANGEMENT THEREFOR

[75] Inventor: Sabatino A. Bianchi, Bloomfield Hills, Mich.

[73] Assignee: Livernois Automation Company, Dearborn, Mich.

[21] Appl. No.: 934,706

[22] Filed: Aug. 24, 1992

[51] Int. Cl.$^5$ .................... F16F 9/36; F16D 15/32
[52] U.S. Cl. .................... 188/322.17; 267/129; 277/29
[58] Field of Search ............ 267/119, 120, 124, 129, 267/130, 136; 188/322.17, 322.18; 277/29

[56] References Cited

U.S. PATENT DOCUMENTS

| | | | |
|---|---|---|---|
| 4,337,956 | 7/1982 | Hopper | 277/29 |
| 4,342,448 | 8/1982 | Wallis | 188/322.17 |
| 4,635,908 | 1/1987 | Ludwig | 267/64.28 |
| 4,741,518 | 5/1988 | Wallis | 267/119 |
| 4,742,997 | 5/1988 | Wallis | 267/119 |
| 4,765,227 | 8/1988 | Balazs et al. | 267/119 |
| 5,007,276 | 4/1991 | Kadis et al. | 267/119 |
| 5,088,698 | 2/1992 | Wallis | 267/119 |

*Primary Examiner*—Andres Kashnikow
*Assistant Examiner*—Chris Schwartz
*Attorney, Agent, or Firm*—Barnes, Kisselle, Raisch, Choate, Whittemore & Hulbert

[57] ABSTRACT

A self-contained gas spring or die cylinder including a cylindrical housing having a closed end, an open end and a cylindrical bore. A cylindrical sleeve extends into the bore of the housing and has at least a portion thereof forming an internal cylindrical surface. A piston rod extends through an opening in the sleeve and has a piston thereon contacting the cylindrical surface. The piston rod is hollow and has a closed end in the portion thereof external of the cylindrical housing. The sleeve supports a first seal assembly adjacent the inner end of the rod and engaging the external surface of the rod, an intermediate slide ring on the sleeve and a secondary seal assembly on the sleeve positioned such that the slide ring is between the primary seal and the secondary seal. The primary seal assembly is of the pressure relieving type so that on the inward movement of the piston rod a portion of the pressure within the housing passes to an intermediate area between the primary seal assembly and the secondary seal assembly such that the secondary seal assembly shares the sealing action with the primary seal. In a modified form, a third primary seal is provided on the sleeve between the sleeve and the cylindrical housing.

4 Claims, 4 Drawing Sheets

HIGH PRESSURE SELF-CONTAINED GAS SPRING OR DIE CYLINDER AND SEALING ARRANGEMENT THEREFOR

BACKGROUND AND SUMMARY OF THE INVENTION

In presses and dies, it has been common to utilize die cylinders which communicate with a manifold and function as die springs. It has also been suggested that self contained gas springs be provided as shown in U.S. Pat. Nos. 4,742,997 and 4,741,518.

A major consideration in connection with a design of self-contained gas springs or die cylinders is that when charged with a gas such as nitrogen at high pressures on the order of 2000 psi, the normal stroke of the piston substantially increases the pressure and the construction must be such as to withstand such high pressures. A further and important factor is the nature of the seals. Heretofore, it has been common to utilize U-shaped cross section seals which are subject to wear and leakage.

Among the objectives of the present invention are to provide a self-contained gas spring or die cylinder which is functional and operates at relatively high pressures; which includes a novel arrangement of seal assemblies; which is dependable, reliable and can be readily manufactured; which requires a minimum of maintenance, and which can be readily maintained and repaired.

In accordance with the invention, a self-contained gas spring or die cylinder, includes a cylindrical housing having a closed end, an open end and a cylindrical bore. A cylindrical sleeve extends into the bore of the housing and has at least a portion thereof forming an internal cylindrical surface. A piston rod extends through an opening in the sleeve and has a piston thereon contacting the cylindrical surface. The piston rod is hollow and has a closed end in the portion thereof external of the cylindrical housing. The sleeve supports a first seal assembly adjacent the inner end of the rod and engaging the external surface of the rod, an intermediate slide ring on the sleeve and a secondary seal assembly on the sleeve positioned such that the slide ring is between the primary seal and the secondary seal. The primary seal assembly is of the pressure relieving type so that on the inward movement of the piston rod a portion of the pressure within the housing passes to an intermediate area between the primary seal assembly and the secondary seal assembly such that the secondary seal assembly shares the sealing action with the primary seal. In a modified form, a third primary seal is provided on the sleeve between the sleeve and the cylindrical housing.

DESCRIPTION

Figures 1, 2:
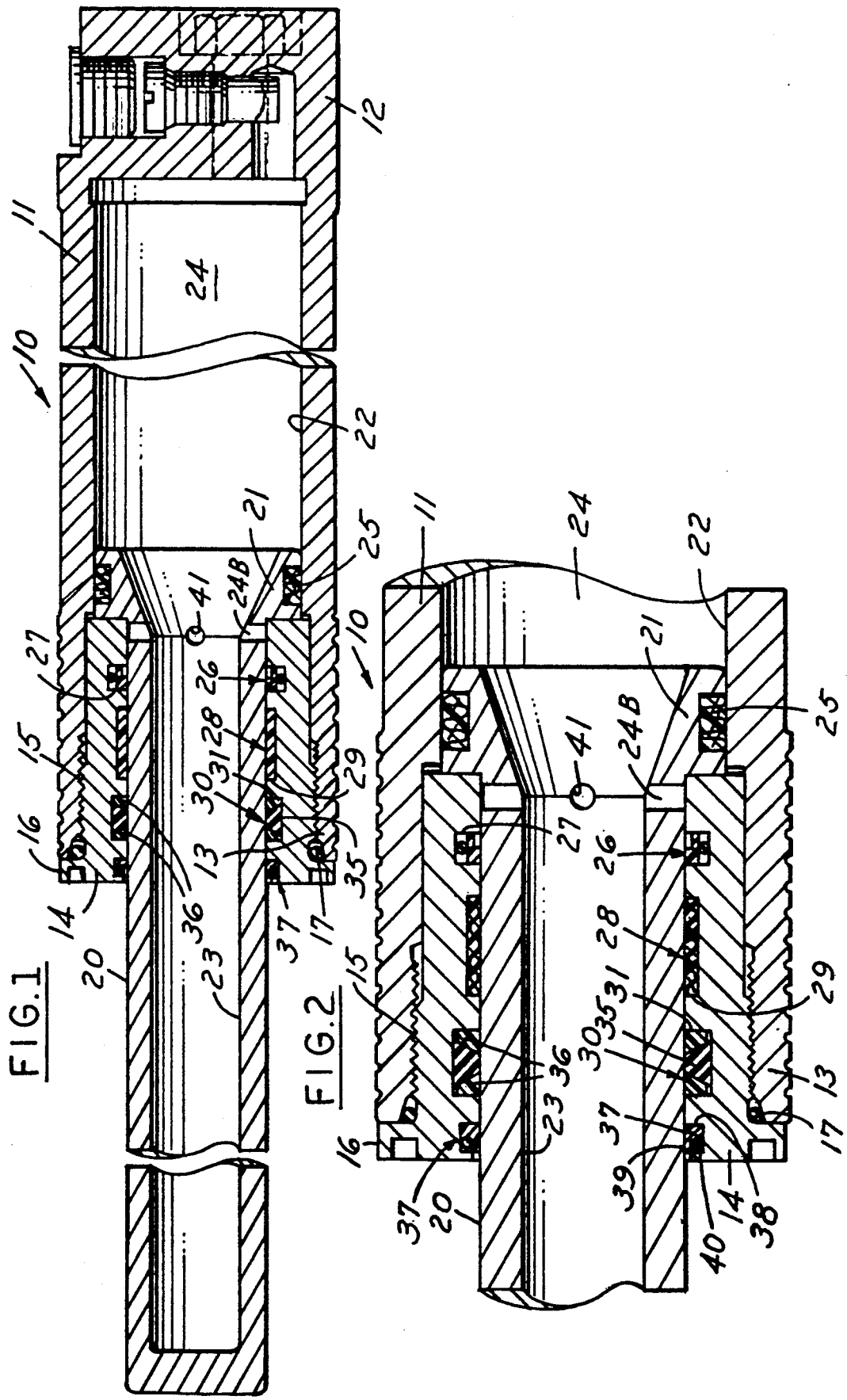
FIG. 1 is a longitudinal sectional view of a die cylinder embodying the invention.
FIG. 2 is a fragmentary sectional view on an enlarged scale.

Referring to FIGS. 1 and 2, a die cylinder 10 embodying the invention comprises a one-piece cylindrical housing 11 having an integral closed end 12 and an open end 13.

A cylindrical sleeve 14 is inserted into the housing 11 and is threaded thereto by interconnecting threads 15 such that a flange 16 engages the open end of the housing 11 and forms a seal through the use of an annular O-ring 17.

A piston rod 20 having an integral piston 21 is positioned such that the piston 21 engages an internal cylindrical surface 22 of the cylindrical housing 11. When the rod 20 moves outwardly it engages the end of the sleeve 14. The rod 20 is hollow defining a chamber 23 that communicates with the chamber 24 of the housing, and also with chamber 24B via transfer holes 41.

In accordance with the invention and shown in FIG. 2, a slide ring 25 is provided on the piston 21. The slide ring 25 guides the piston rod in its movement between fully extended and retracted position. A primary seal assembly 26 is mounted in a recess 27 in the sleeve 14 in the end of the sleeve 14 which is adjacent the chamber 24. A slide ring 28 is provided in a recess 29 in the sleeve 14 adjacent the primary seal assembly 26. A secondary seal assembly 30 is provided in a recess 31 in the sleeve 14.

As presently described, the seal assembly 26 functions so that at static position or on retraction of the piston rod by a force thereon, the primary seal assembly functions to relieve some of the pressure within chamber 24 permitting it to pass between the surfaces of the rod 20 and the sleeve 14 to the secondary seal assembly 30 so that the secondary seal assembly 30 shares the sealing action with the primary seal assembly 26.

As shown in FIGS. 1, 2, 3 and 4, the primary seal assembly 26 comprises an annular stepped ring 32 of plastic material and is yieldingly urged radially inwardly by a spring preferably in the form of an O-ring 33. The stepped ring 31 defines an annular space 34 adjacent the piston end of the piston rod 20. Such a seal assembly is manufactured and sold under the trademark Step-Seal K-R by W. S. Shamban & Co., Fort Wayne, Ind. The stepped ring 32 is preferably made of an ultra high molecular weight polyethylene. The O-ring 33 is preferably made of elastomeric material.

Figure 3:
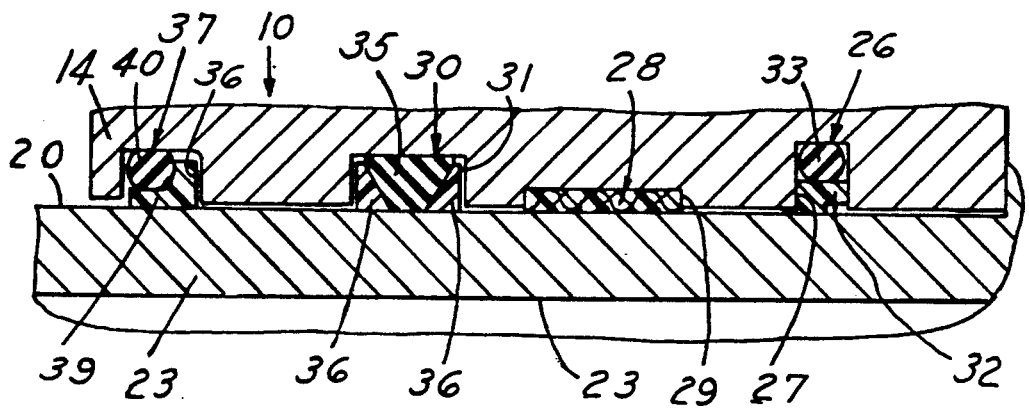
FIG. 3 is a fragmentary sectional view on an enlarged scale of a portion of the die cylinder shown in FIGS. 1 and 2.

As shown in FIGS. 1, 2 and 3, the secondary seal assembly 30 comprises an annular elastomeric ring 35 that has surfaces converging toward the rod and a pair of plastic rings 36 with corresponding surfaces engaging the elastomeric ring. The cross section of elastomeric ring 35 is trapezoidal and the cross section of the rings 36 is triangular.

The plastic rings 36 are preferably made of carbon filled tetrafluroethylene and the elastomeric ring 35 is preferably made of molded nitrile rubber having a durometer of 85.

Figure 4:
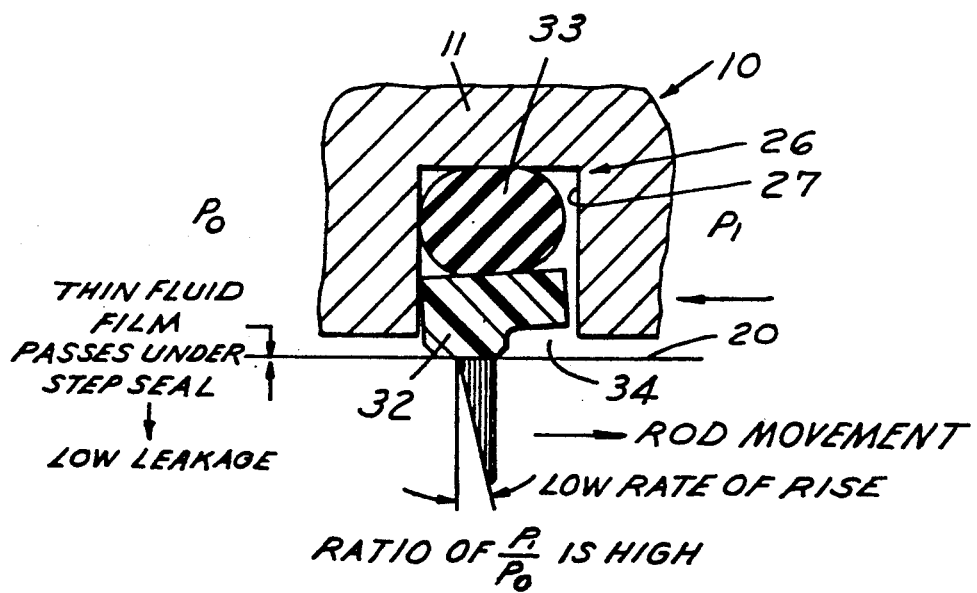
FIG. 4 is a partly diagrammatic sectional view of a portion of the die cylinder.

As shown partly diagrammatically in FIG. 4, when the piston rod 20 is moved inwardly of the housing 11, the stepped ring 32 tilts permitting a partial venting of the gas pressure to pass to the left toward the secondary assembly 30. As a result the secondary seal assembly 30 shares the sealing action with the primary seal assembly 26.

As further shown, in accordance with the invention, an anti-contaminant seal assembly 37 is provided in an annular groove 38 at the outer end of the sleeve 14. Seal assembly 37 comprises an L-shaped plastic ring 39 yieldingly urged inwardly by an O-ring 40, with the O-ring 40 facing the outer end. The ring 39 is preferably made of ultra high molecular weight polyethylene.

The slide ring 28 preferably comprises a molded phenolic impregnated glass filled nylon cloth which is dimensionally stable at the operating temperatures of the cylinder.

Figure 5:
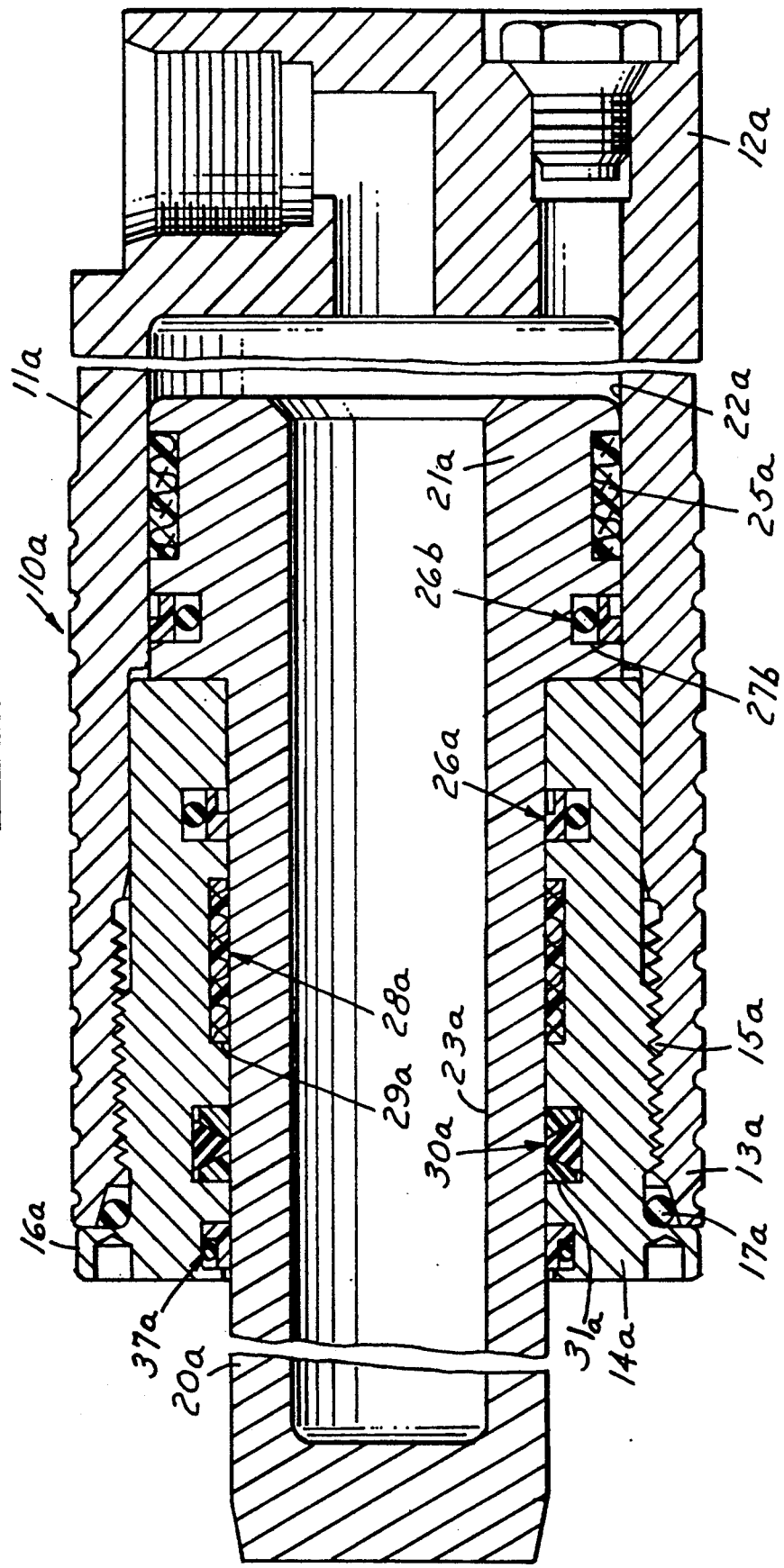
FIG. 5 is a longitudinal sectional view of a modified form of die cylinder.

In the form of cylinders shown in FIG. 5, an additional primary seal assembly 26b is provided in a groove 27a in piston 21a between the piston 21a on the rod 20a and the cylindrical housing 11a.

The primary seal assemblies 26a, 26b are identical to the primary seal 26 in FIGS. 1–4. All other parts are identical and have been identified with the suffix a.

Figure 6:
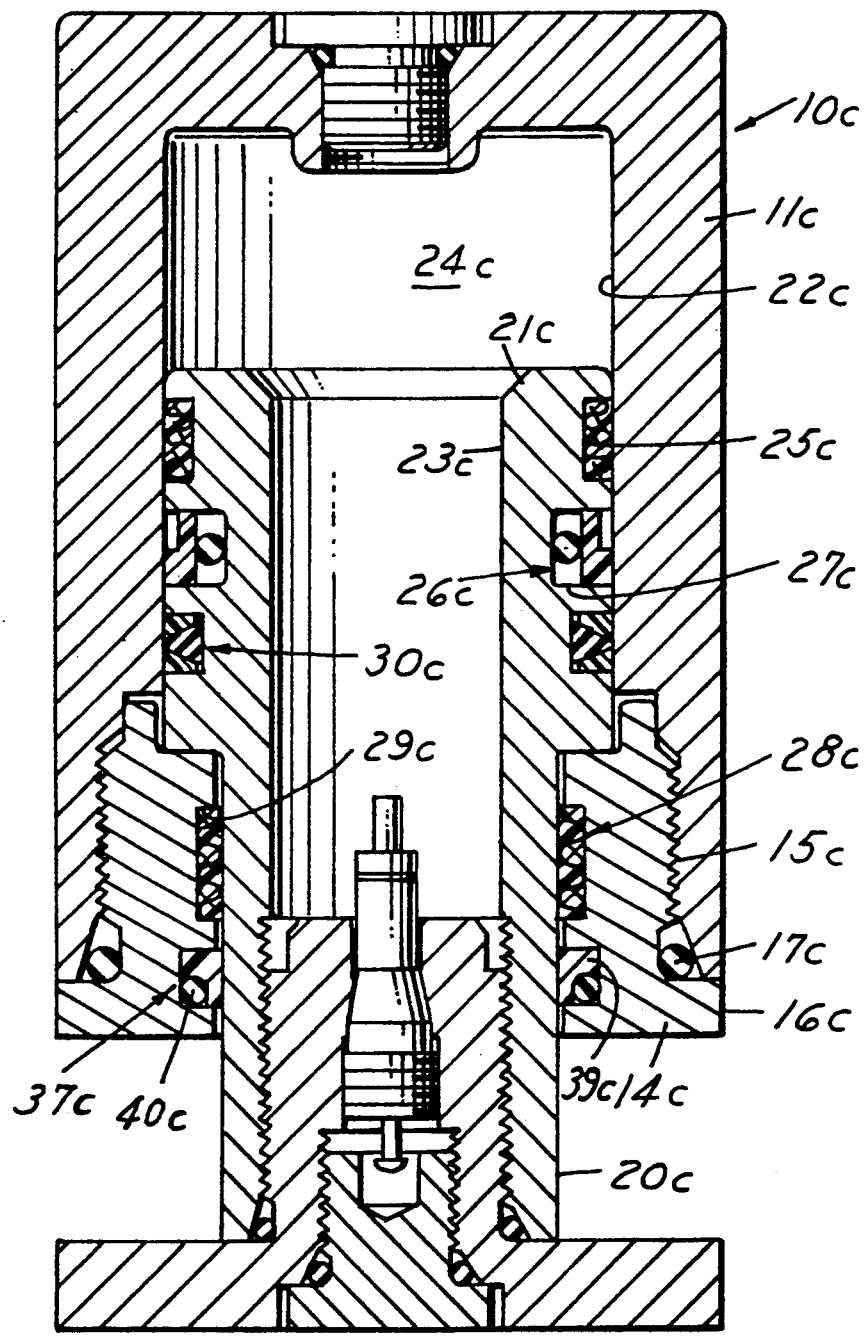
FIG. 6 is a longitudinal sectional view of a modified form of the invention as applied to another die cylinder.

In the form of the invention shown in FIG. 6, the invention is shown as applied to a self contained die cylinder as shown in copending application of Bernard J. Wallis, Ser. No. 07/715,594, filed Jun. 14, 1991, incorporated herein by reference. In this form, the primary seal assembly 26c, secondary seal 30c and slide ring 25c are provided on the piston 21c and the anti-contaminant ring assembly 37c is provided on the sleeve 14c.

It can thus be seen that there has been provided a self-contained gas spring or die cylinder which is functional and operates at relatively high pressures; which includes a novel arrangement of seal assemblies; which is dependable, reliable and can be readily manufactured; which requires a minimum of maintenance, and which can be readily maintained and repaired.

I claim:

1. A self-contained die cylinder comprising
a cylinder housing,
said cylinder housing having an open end and a closed end,
a piston rod having a piston thereon,
said die cylinder containing gas under pressure,
interengaging means on the housing defining a cylindrical surface engaged by said piston,
a pressure relieving primary seal assembly on one of said sleeve and said piston rod and engaging the other of said sleeve and engaging said piston rod,
a secondary seal assembly spaced from said primary seal assembly on one of said sleeve and said piston rod and engaging the other of said sleeve and said piston rod, and
said interengaging means comprises a sleeve provided in the open end of said housing, said sleeve supporting said primary and secondary seals,
said pressure relieving primary sealing assembly being constructed and arranged such that as said piston rod is moved inwardly of said housing, a partial venting of gas pressure in said die cylinder occurs and the gas passes toward said secondary assembly, said secondary seal assembly providing a seal for the gas pressure partially vented toward the secondary seal assembly such that said secondary seal assembly shares the sealing action with the primary seal assembly.

2. The die cylinder set forth in claim 1 wherein said primary seal assembly comprises a stepped ring engaging said piston rod and defining an annular space facing inwardly of said housing and an elastomeric ring yieldingly urging said stepped ring inwardly such that when said piston rod is moved inwardly of said housing, said stepped ring tilts permitting a partial venting of the gas pressure to pass toward the secondary seal assembly, said secondary seal assembly comprising an elastomeric ring having a trapezoidal side surface converging toward said piston rod and plastic rings having complementary surfaces engaging said converging surfaces.

3. The die cylinder set forth in claim 2 including an anti-contaminant seal adjacent the outer end of said housing, said seal comprising a plastic ring having an L-shaped cross section and an elastomeric ring yieldingly urging said plastic ring radially inwardly.

4. The die cylinder set forth in claim 3 including a slide ring between said primary seal assembly and said secondary seal assembly and engaging said piston rod.

* * * * *